US010541618B2

(12) United States Patent
Gong (10) Patent No.: US 10,541,618 B2
(45) Date of Patent: Jan. 21, 2020

(54) METHOD AND APPARATUS FOR MEASURING AT LEAST ONE OF OUTPUT CURRENT AND OUTPUT POWER FOR ISOLATED POWER CONVERTERS

(71) Applicant: Infineon Technologies Austria AG, Villach (AT)

(72) Inventor: Xiaowu Gong, Singapore (SG)

(73) Assignee: Infineon Technologies Austria AG, Villach (AT)

(*) Notice: Subject to any disclaimer, the term of this patent is extended or adjusted under 35 U.S.C. 154(b) by 0 days.

(21) Appl. No.: 15/672,341

(22) Filed: Aug. 9, 2017

(65) Prior Publication Data

US 2019/0052174 A1 Feb. 14, 2019

(51) Int. Cl.
*H02M 3/335* (2006.01)
*H02M 7/48* (2007.01)
*H02M 1/00* (2006.01)
*H02M 1/42* (2007.01)
*G05F 1/575* (2006.01)
*H02M 3/156* (2006.01)
*H02M 1/12* (2006.01)

(52) U.S. Cl.
CPC .......... *H02M 3/3353* (2013.01); *G05F 1/575* (2013.01); *H02M 1/4258* (2013.01); *H02M 3/156* (2013.01); *H02M 3/33507* (2013.01); *H02M 3/33561* (2013.01); *H02M 3/33576* (2013.01); *H02M 2001/0038* (2013.01); *H02M 2001/123* (2013.01)

(58) Field of Classification Search
CPC ......... H02M 3/33507; H02M 3/33523; H02M 3/33546; H02M 2007/4815; H02M 2001/0009; H02M 2001/0016; H02M 1/4258; H02M 3/33561; G05F 1/575
See application file for complete search history.

(56) References Cited

U.S. PATENT DOCUMENTS 5,903,452 A * 5/1999 Yang ................. H02M 3/33507
363/131
6,344,983 B1 * 2/2002 Glennon ........... H02M 3/33507
363/21.01

(Continued)

*Primary Examiner* — Adolf D Berhane
*Assistant Examiner* — Sisay G Tiku
(74) *Attorney, Agent, or Firm* — Murphy, Bilak & Homiller, PLLC (57) ABSTRACT

A flyback converter includes a primary-side switch connected to a primary-side winding of a magnetic device and a secondary-side switch connected to a secondary-side winding of the magnetic device. The flyback converter is operated by controlling the primary-side switch to store energy in the magnetic device during ON periods of the primary-side switch, switching on the secondary-side switch synchronously with switching off the primary-side switch to transfer energy from the magnetic device to the secondary side, determining an off time of the secondary-side switch based on a reflected input voltage measured at the secondary-side winding when the primary-side switch is on, accounting for a settling time of the reflected input voltage when determining the off time of the secondary-side switch so that the settling time has little or no effect on the off time, and switching off the secondary-side switch based on the off time.

20 Claims, 9 Drawing Sheets (56) References Cited

U.S. PATENT DOCUMENTS

| | | | | |
|---|---|---|---|---|
| 6,385,059 B1* | 5/2002 | Telefus | ............ | H02M 3/33507 363/21.07 |
| 7,016,204 B2* | 3/2006 | Yang | ................ | H02M 3/33507 363/21.13 |
| 7,061,225 B2* | 6/2006 | Yang | ................ | H02M 3/33507 324/103 P |
| 7,663,352 B2 | 2/2010 | Yang et al. | | |
| 7,671,486 B2* | 3/2010 | Yang | ................ | H02M 3/33507 307/31 |
| 7,684,220 B2* | 3/2010 | Fang | ........................ | H02H 7/12 361/93.2 |
| 7,965,528 B2* | 6/2011 | Yang | ................ | G01R 19/0092 363/21.12 |
| 8,068,354 B2* | 11/2011 | Wang | ................ | H02M 3/33507 323/276 |
| 8,634,212 B2* | 1/2014 | Tang | ................ | H02M 3/33507 363/21.15 |
| 8,963,515 B2* | 2/2015 | Sun | ........................ | H02M 3/158 323/225 |
| 9,553,501 B2* | 1/2017 | Yao | ........................ | H02H 9/025 |
| 9,735,689 B2* | 8/2017 | Oyama | ............ | H02M 3/33523 |
| 2009/0058389 A1* | 3/2009 | Yang | ................ | H02M 3/33507 323/301 |
| 2010/0061124 A1* | 3/2010 | Gong | ................ | H02M 3/33507 363/21.04 |
| 2013/0293270 A1* | 11/2013 | Lee | .................... | H03K 5/00006 327/113 |
| 2016/0181929 A1* | 6/2016 | Chen | ................ | H02M 3/33507 363/21.18 |

\* cited by examiner

METHOD AND APPARATUS FOR MEASURING AT LEAST ONE OF OUTPUT CURRENT AND OUTPUT POWER FOR ISOLATED POWER CONVERTERS

TECHNICAL FIELD

The present application relates to isolated power converters, in particular measuring at least one of output current and output power for isolated power converters.

BACKGROUND

Converters having an isolated topology, such as flyback and forward converters, are widely used in power conversion. A forward converter is a DC/DC converter that increases or decreases the output voltage and provides galvanic isolation for the load. A flyback converter can be used for both AC/DC and DC/DC conversion, with galvanic isolation between input and output. In both cases, a controller generates a switching signal to regulate the output of the power converter in response to a feedback signal. The switching signal drives a power switch device for switching a magnetic device such as a transformer or two inductors sharing a common core. The magnetic device is connected to an input voltage of the power converter. The energy of the magnetic device is transferred to the output of the power converter through a rectifier and a capacitor. A resistor is typically connected in series with the power switch device to generate a current sense signal in response to the switching current of the magnetic device. The current sense signal is input to the controller for controlling operation of the power converter.

Isolated power converters may be operated in discontinuous current mode (DCM) when the magnetic device is fully discharged before the start of the next switching cycle. If the switching signal is enabled before the magnetic device is fully discharged, the power converter may be operated in continuous current mode (CCM). A continuous current may be maintained in the magnetic device when an isolated power converter is operated in CCM. In both DCM and CCM cases, the maximum allowable output current and/or maximum allowable power for the converter system must be determined to ensure proper operation of the converter.

Conventional approaches for detecting output current when an isolated power converter is operated in CCM require peak detection and sample-hold for the peak value of the current sense signal which corresponds to the switching current of the magnetic device. However, the peak detection and sample-hold circuit has inherent delay, and the resulting sample-hold voltage output by the circuit is higher than the actual peak voltage of the current sense signal, resulting in measurement inaccuracy. Also, at the start of each switching cycle in CCM, a leading edge spike occurs in the current sense signal, which obscures the measurement of the initial continuous current which represents the energy stored in the magnetic device at the start of the switching cycle. Moreover, conventional peak detection and sample-hold circuits measure only average output current and not output power.

SUMMARY

According to an embodiment of a power converter, the power converter comprises a power switch device coupled to a magnetic device and a controller. The controller is operable to generate a switching signal for driving the power switch device, based on a feedback signal and a current sense signal which corresponds to a switching current of the magnetic device. The controller also is operable to calculate at least one of an average output current and a maximum output power for the power converter, based on at least two measurements of the current sense signal taken during a turn-on period of the power switch device. A first one of the at least two measurements is taken at the end of a first time delay from the start of the turn-on period, and a second one of the at least two measurements is taken when a magnitude of the current sense signal reaches a predefined threshold voltage assigned to the power switch device and above which the power switch device is designed to turn-off.

According to an embodiment of a method of operating a power converter having a power switch device coupled to a magnetic device, the method comprises: generating a switching signal for driving the power switch device, based on a feedback signal and a current sense signal which corresponds to a switching current of the magnetic device; capturing a first measurement of the current sense signal taken at the end of a first time delay from the start of a turn-on period of the power switch device; capturing a second measurement of the current sense signal taken when a magnitude of the current sense signal reaches a predefined threshold voltage assigned to the power switch device and above which the power switch device is designed to turn-off; and calculating at least one of an average output current and a maximum output power for the power converter, based on at least the first and the second captured measurements of the current sense signal.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein accurately measure at least one of output current and output power for isolated power converters such as flyback and forward converters. By using turn-off delay time for the main power switch device of the converter as a leading edge blanking time for generating a sample and hold pulse signal, average output current and/or output power can be calculated accurately. The circuitry employed has reduced complexity in that there is no need for peak detection and hold. Also, accurate valley (initial) voltage information can be obtained while avoiding errors introduced by leading edge spikes at the start of each switching cycle. The embodiments described herein apply to both CCM and DCM operation, and are described in further detail below in the context of a flyback converter, but are also applicable to other types of isolated power converters such as forward converters.

Figure 1:
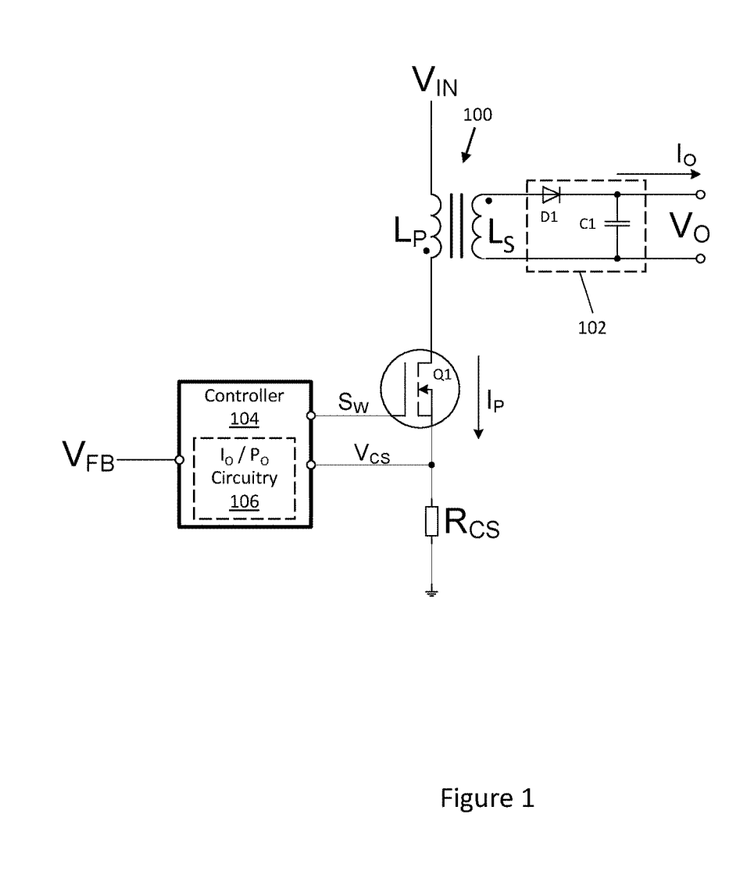
FIG. 1 illustrates a block diagram of an embodiment of a flyback converter designed to measure at least one of output current and output power.

FIG. 1 illustrates an embodiment of a flyback converter that includes a primary-side power switch device Q1 connected to a primary-side winding $L_P$ of a magnetic device 100 such as a transformer or two inductors sharing a common core, a rectification circuit 102 e.g. including a diode D1 and a capacitor C1 connected to a secondary-side winding $L_S$ of the magnetic device 100, and a primary-side controller 104 operable to regulate the output of the power converter. The controller 104 generates a switching signal $S_W$ for driving the power switch device Q1, based on a feedback signal $V_{FB}$ and a current sense signal $V_{CS}$. The magnetic device 100 is connected to an input voltage $V_{IN}$ of the power converter, and the energy stored in the magnetic device 100 is transferred to the output voltage $V_O$ of the power converter through the diode D1 and capacitor C1. A resistor $R_{CS}$ connected in series with the power switch device Q1 generates the current signal $V_{CS}$ in response to the switching current $I_P$ of the magnetic device 100.

The primary-side switch device Q1 is shown as a power MOSFET in FIG. 1. However, any suitable power transistor can be used for switch device Q1 such as but not limited to a power MOSFET, IGBT (insulated gate bipolar transistor), HEMT (high-electron mobility transistor), etc. Switching of the primary-side power switch device Q1 is controlled by the primary-side controller 104 which generates switching signal $S_W$ based on the input voltage $V_{IN}$, the switching current $I_P$ of the magnetic device 100 as represented by current sense signal $V_{CS}$ developed across resistor $R_{CS}$, and feedback signal $V_{FB}$. Switching control of a primary-side power switch device of a flyback converter is well known in the art, and therefore no further explanation is provided with respect to the switching control of power switch device Q1.

Circuitry 106 included in or associated with the power converter controller 104 calculates at least one of an average output current and an output power for the power converter, based on at least two measurements of the current sense signal $V_{CS}$ taken during the turn-on period ($T_{ON}$) of the power switch device Q1 each switching cycle. A first one of the at least two measurements is taken at the end of a first time delay ($t_{LEB}$) from the start of the turn-on period. A second one of the at least two measurements is taken when a magnitude of the current sense signal $V_{CS}$ reaches a predefined threshold voltage ($V_{th}$) assigned to the power switch device Q1 and above which the power switch device Q1 is designed to turn-off. With these two captured measurements of the current sense signal $V_{CS}$, the circuitry 106 included in or associated with the controller 104 can calculate the average output current for the power converter. By capturing a third measurement of the current sense signal $V_{CS}$ taken between the first and second measurements, the circuitry 106 can also calculate the output power for the power converter. Calculation of the average output current is described next, followed by calculation of the output power.

Average Output Current Calculation

Figure 2:
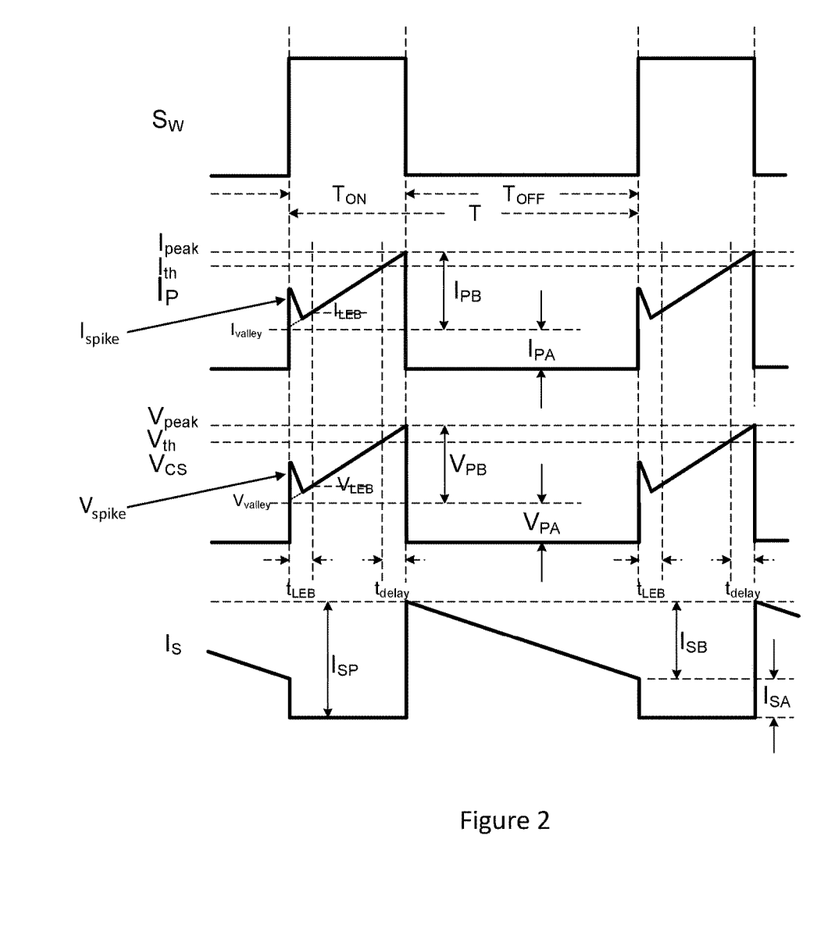
FIGS. 2 and 3 illustrate various waveforms associated with operation of the flyback converter of FIG. 1.

FIG. 2 illustrates various waveforms associated with operation of the flyback converter shown in FIG. 1. The output current $I_O$ of the power converter can be expressed as given by:

$$I_O = \frac{(I_{SP} + I_{SA})}{2} \times \frac{T_{OFF}}{T} \quad (1)$$

where $I_{SP}$ is the peak of secondary-side output current signal $I_S$, $I_{SA}$ the valley value of the secondary-side output current $I_S$, and $I_O$ is the average secondary-side continuous output current.

By substituting the primary-side current in equation (1), the output current $I_O$ is given by:

$$\begin{aligned} I_O &= \frac{\left(\frac{N_P}{N_S} \times I_{PP} + \frac{N_P}{N_S} \times I_{PA}\right)}{2} \times \frac{T_{OFF}}{T} \\ &= \frac{1}{2} \times \left(\frac{N_P}{N_S}\right) \times \frac{1}{R_{CS}} \times \frac{1}{T} \times (V_{peak} + V_{PA}) \times T_{OFF} \\ &= \frac{1}{2} \times \left(\frac{N_P}{N_S}\right) \times \frac{1}{R_{CS}} \times \frac{1}{T} \times (V_{peak} + V_{valley}) \times T_{OFF} \end{aligned} \quad (2)$$

where $N_P$ is the number of turns of the primary-side winding $L_P$, $N_S$ is the number of turns of the secondary-side winding $L_S$, T is the switching period, $T_{OFF}$ is turn-off period of the primary-side power switch device Q1, $V_{valley}$ is the magnitude of the current sense signal $V_{CS}$ at turn-on of the power switch device Q1, and $V_{peak}$ is the magnitude of the current sense signal $V_{CS}$ at turn-off of the power switch device Q1.

From equation (2), if the integration of $(V_{peak}+V_{valley}) \times T_{OFF}$ is constant, the output current $I_O$ of the flyback converter will be constant and does not depend on input voltage $V_{IN}$. However, as shown in FIG. 2, there is a leading edge spike $I_{spike}$ in the switching current $I_P$ of the magnetic device at the start of each new switching cycle (T), and hence a corresponding spike $V_{spike}$ in the current sense signal $V_{CS}$ processed by the controller 104. If this leading edge spike is not accounted for, the $V_{valley}$ measurement taken at the start of the turn-on period ($T_{ON}$) of Q1 will have significant error/inaccuracy.

Figure 3:
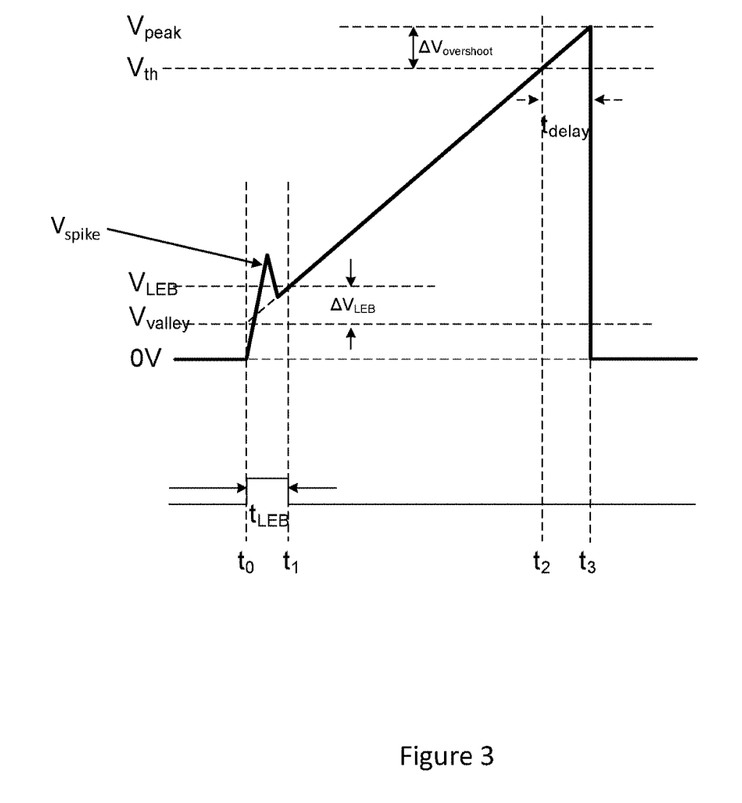

FIG. 3 illustrates one switching cycle of the $V_{CS}$ waveform with the problematic leading edge spike $V_{spike}$. At the start ($t_0$) of the turn-on period $T_{ON}$ of the primary-side power switch device Q1, the current sense signal $V_{CS}$ begins to ramp up quickly in response to a corresponding spike $I_{spike}$ in the switching current $I_P$ of the magnetic device. At time $t_1$, the spike $V_{spike}$ in the current sense signal $V_{CS}$ has already subsided. The delay ($t_{LEB}$) between time to and $t_1$ is referred to herein as leading edge blanking time, and is determined so as to allow the spike $V_{spike}$ in the current sense signal $V_{CS}$ to subside by time $t_1$. After time $t_1$, the current sense signal $V_{CS}$ ramps up slowly and follows $$\frac{V_{in}}{L_p} \times R_{CS} \times t.$$

Also, the controller 104 captures a measurement of the current sense signal $V_{CS}$ taken at time e.g. by sampling and holding the $V_{CS}$ measurement at $t_1$. At time $t_2$, the current sense signal $V_{CS}$ equals the predefined threshold voltage $V_{th}$ assigned to the power switch device Q1. The power switch device Q1 is designed to turn-off above this threshold voltage.

However, there is inherent delay before the power switch device Q1 turns off, e.g. due to comparator circuitry used to detect when $V_{CS}$ equals $V_{th}$ and driver circuitry used to drive the primary-side power switch device Q1. Hence, the power switch device Q1 turns off at time $t_3$. The delay between time $t_2$ and $t_3$ is referred to herein as turn-off delay ($t_{delay}$). Based on the conditions explained above, the following equations are derived:

$$V_{valley} = V_{LEB} - \Delta V_{LEB} \quad (3)$$

$$V_{peak} = V_{th} \Delta V_{overshoot} \quad (4)$$

The term ($V_{peak} + V_{valley}$) can then be expressed as:

$$\begin{aligned} V_{peak} + V_{valley} &= (V_{th} + \Delta V_{overshoot}) + (V_{LEB} - \Delta V_{LEB}) \\ &= (V_{th} + V_{LEB}) + (\Delta V_{overshoot} - \Delta V_{LEB}) \end{aligned} \quad (5)$$

where $\Delta V_{LEB}$ is the difference between $V_{CS}$ at times $t_0$ and $t_1$, and $\Delta V_{overshoot}$ is the difference between $V_{CS}$ at times $t_2$ and $t_3$.

In one embodiment, in the present switching cycle the controller 104 determines the turn-off delay $t_{delay}$ from when the current sense signal $V_{CS}$ reaches the predefined threshold voltage $V_{th}$ assigned to the primary-side power switch device Q1 to when the power switch device Q1 turns off. In the next switching cycle, the controller 104 sets the leading edge blanking time $t_{LEB}$ for capturing the first measurement $V_{LEB}$ of the current sense signal $V_{CS}$ to the turn-off delay $t_{delay}$ determined for the preceding switching cycle. In one embodiment, the controller 104 determines the turn-off delay $t_{delay}$ as the amount of time needed for the magnitude of the current sense signal $V_{CS}$ to transition from reaching the predefined threshold voltage $V_{th}$ assigned to the power switch device to reaching zero volts at the end of the switching cycle.

By setting the leading edge blanking time $t_{LEB}$ for the next switching cycle equal to the turn-off delay $t_{delay}$ determined for the preceding switching cycle, $\Delta V_{overshoot} = \Delta V_{LEB}$ and equation (5) simplifies to:

$$V_{peak} + V_{valley} = V_{th} + V_{LEB} \quad (6)$$

Because the controller 104 can capture (e.g. sample and hold) the $V_{LEB}$ measurement value of the current sense signal $V_{CS}$ taken at time $t_1$, and the threshold voltage $V_{th}$ assigned to the power switch device Q1 is predefined and known to the controller 104, the CCM operation output current can be calculated by the controller 104.

Figure 4:
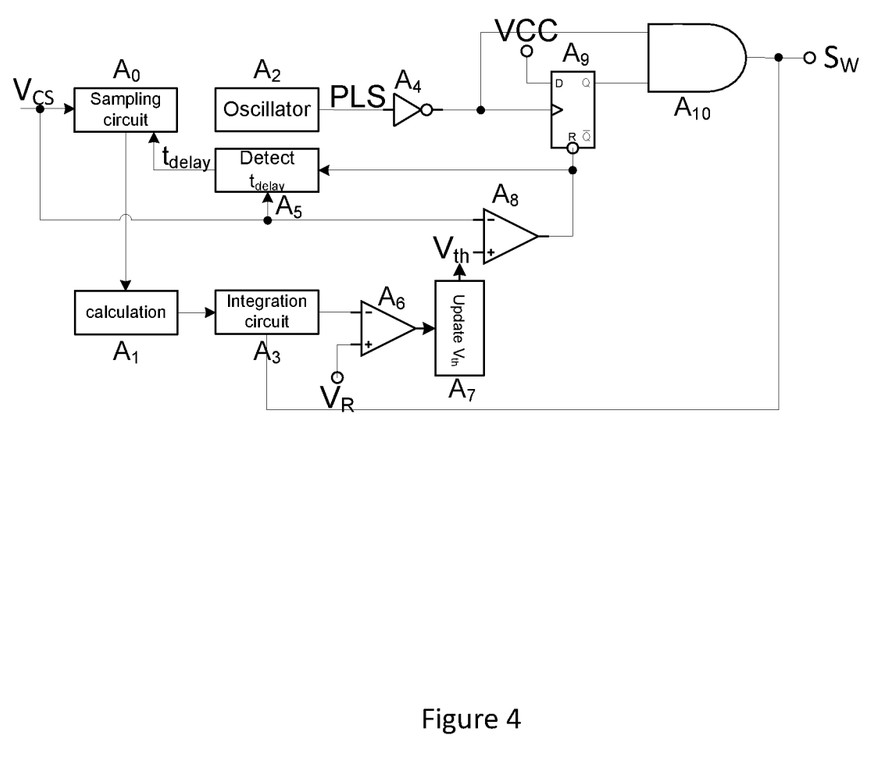
FIG. 4 illustrates a circuit diagram of an embodiment of circuitry for measuring output current for an isolated converter.

FIG. 4 illustrates an embodiment of the circuitry 106 included in or associated with the controller 104 for calculating the output current of the isolated converter for CCM operation. According to this embodiment, sample and hold circuit $A_0$ samples and holds (captures) the voltage value of current sense signal $V_{CS}$ measured at time $t_1$, just after the leading edge blanking time $t_{LEB}$ lapses, and uses the turn-off delay $t_{delay}$ determined by circuit $A_5$ for the preceding switching cycle as the leading edge blanking time $t_{LEB}$. Comparator $A_5$ determines when the current sense signal $V_{CS}$ reaches the predefined threshold voltage $V_{th}$ assigned to the primary-side power switch device Q1. The power switch device Q1 turns off some time after $V_{CS}$ reaches $V_{th}$. After $V_{CS}$ goes higher than $V_{th}$, circuit $A_5$ detects the turn-off of the power switch Q1, e.g. when $V_{CS}$ drops to 0V, and provides the corresponding turn-off delay $t_{delay}$ value to sample and hold circuit $A_0$. Oscillator $A_2$ generates signal PLS, and in conjunction with buffer $A_4$, flip-flop $A_9$ and logic gate $A_{10}$, turns on the power switch device Q1 at the beginning of the next switching cycle.

After the primary-side power switch device Q1 is turned off, circuit $A_1$ calculates $W_{LEB} + V_{th}$ and circuit $A_3$ integrates the sum over the turn-off period $T_{OFF}$ of power switch device Q1 to calculate the average output current for the power converter. Comparator $A_6$ compares the output of circuit $A_3$ with target voltage $V_R$. Circuit $A_7$ updates the predefined threshold voltage $V_{th}$ assigned to the power switch device Q1 for the next switching cycle, based on the comparison results as follows. If the integrated sum of $V_{LEB} + V_{th}$ is above $V_R$, circuit $A_7$ decreases $V_{th}$ for the next switching cycle to decrease the integration output. If the integrated sum of $V_{LEB} + V_{th}$ is below $V_R$, circuit $A_7$ increases $V_{th}$ for the next switching cycle to increase the integration output. If the integrated sum of $V_{LEB} + V_{th}$ is within $V_R$ plus tolerance (e.g. 2%, 5%, etc.), circuit $A_7$ maintains $V_{th}$ at the present level for the next switching cycle to keep the integration output the same as the previous switching cycle.

Figure 5:
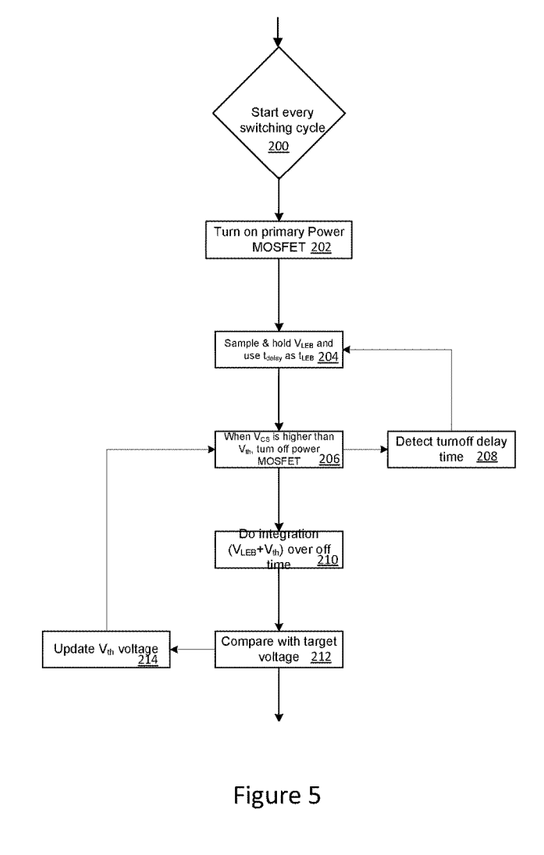
FIG. 5 illustrates a flow diagram of an embodiment of a method for measuring output current for an isolated converter.

FIG. 5 illustrates an embodiment of a method for calculating the average output current of the power converter. At the start of each switching cycle (Block 200), the primary-side power switch device Q1 is turned on by internal oscillator output signal PLS (Block 202). The controller 104 samples and holds (captures) the $V_{CS}$ measurement $V_{LEB}$ taken just after the leading edge blanking time $t_{LEB}$, where $t_{LEB}$ equals the turn-off delay $t_{delay}$ from the previous switching cycle (Block 204). When the $V_{CS}$ voltage reaches the predefined threshold voltage $V_{th}$ assigned to the power switch device Q1, the controller 104 initiates turn-off of Q1 (Block 206). After the primary-side power switch device Q1 is turned off, the controller 104 detects the turn-off delay for Q1 (Block 208) and uses this delay value as the leading edge blanking time $t_{LEB}$ for the next switching cycle (Block 204). The controller 104 also integrates $V_{LEB} + V_{th}$ over the turn-off period $T_{OFF}$ of power switch device Q1 to calculate the average output current for the power converter (Block 210). The controller 104 compares the integration results with a target voltage $V_{th}$ (Block 212), and updates the predefined threshold voltage V, for the next switching cycle $V_{th}$ (Block 214).

As explained above, when the output of the integration is higher than target voltage $V_R$, for the next switching cycle, the controller 104 can reduce $V_{TH}$ to decrease the integration output. When the output of the integration is lower than target voltage $V_R$, for the next switching cycle, the controller 104 can increase $V_{TH}$ to increase the integration output. When the output of the integration is within some tolerance of $V_R$, for the next switching cycle, the controller 104 can maintain $V_{TH}$ so that the output of the integration is the same as the previous switching cycle.

Maximum Output Power Calculation

In addition or separately, the controller 104 can calculate the output power for the isolated power converter. For CCM operation, the switching frequency $f_s$ can be presumed constant, and the efficiency η is constant. Under these conditions, the converter output power is determined by the energy stored in each switching cycle as given by:

$$p_{omax} = \frac{1}{2} \times f_s \times L_P \times (I_{peak}^2 - I_{valley}^2) \times \eta \quad (7)$$

$$= \frac{1}{2 \times R_{CS}^2} \times f_s \times L_P \times (V_{peak}^2 - V_{valley}^2) \times \eta$$

where $L_P$ is the magnetizing inductance of the primary coil $L_P$ of the magnetic device 100, and $V_{peak}$ and $V_{valley}$ correspond to the peak and valley values, respectively, of the primary inductor current $I_P$. Parameters $V_{peak}$ and $V_{valley}$ are used in assessing maximum power limitation.

Figure 6:
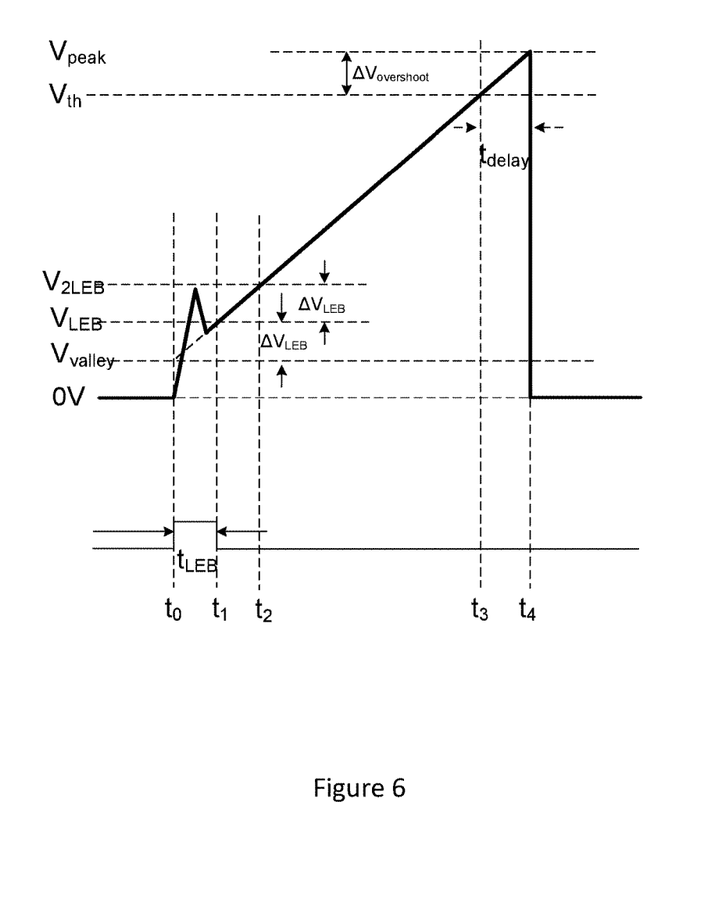
FIG. 6 illustrates various waveforms associated with measuring output power for the flyback converter of FIG. 1.

FIG. 6 illustrates an embodiment of detecting $V_{peak}$ and $V_{valley}$ individually. At time $t_0$, the current sense signal $V_{CS}$ starts to ramp up quickly. The leading edge blanking time $t_{LEB}$ finishes at time $t_1$. After time $t_1$, the current sense signal $V_{CS}$ ramps up slowly and follows $$\frac{V_{in}}{L_p} \times R_{CS} \times t.$$

Also at time $t_1$, the controller 104 samples and holds (captures) the $V_{CS}$ voltage which is at level $V_{LEB}$. After another leading edge blanking time $t_{LEB}$ finishes at time $t_2$, the controller 104 samples and holds (captures) the $V_{CS}$ voltage which is at level $V_{2LEB}$. At time $t_3$, the $V_{CS}$ voltage equals the predefined threshold voltage $V_{th}$ assigned to the primary-side power switch device Q1. After some off-time delay $t_{delay}$ during which $V_{CS}$ increases above $V_{th}$ and then decreases to 0V, the power switch device Q1 turns off at time $t_4$.

The controller 104 can determine the $V_{peak}$ and $V_{valley}$ parameters as follows:

$$V_{valley} = V_{LEB} + \Delta V_{LEB} \quad (8)$$

$$V_{peak} = V_{th} + \Delta V_{overshoot} \quad (9)$$

$$V_{2LEB} = V_{LEB} + \Delta V_{LEB} \quad (10)$$

By making the leading edge blanking time $t_{LEB}$ for the next switching cycle equal to the turn-off delay time $t_{delay}$ from the previous switching cycle, $\Delta V_{overshoot} = \Delta V_{LEB}$ and equations (8) and (9) simplify as follows:

$$V_{valley} = V_{LEB} - (V_{2LEB} - V_{LEB}) \quad (11)$$
$$= 2 \times V_{LEB} - V_{2LEB}$$

$$V_{peak} = V_{th} + (V_{2LEB} - V_{LEB}) \quad (12)$$

Because the voltage measurement $V_{LEB}$ can be captured (e.g. by sampling and hold) from the current sense signal $V_{CS}$ measurement taken at time $t_1$, the voltage measurement $V_{LEB2}$ can be similarly captured from the $V_{CS}$ measurement taken at time $t_2$, and voltage $V_{th}$ is a predefined threshold voltage known to the controller 104, the controller 104 can calculate the converter output power in CCM operation.

Figure 7:
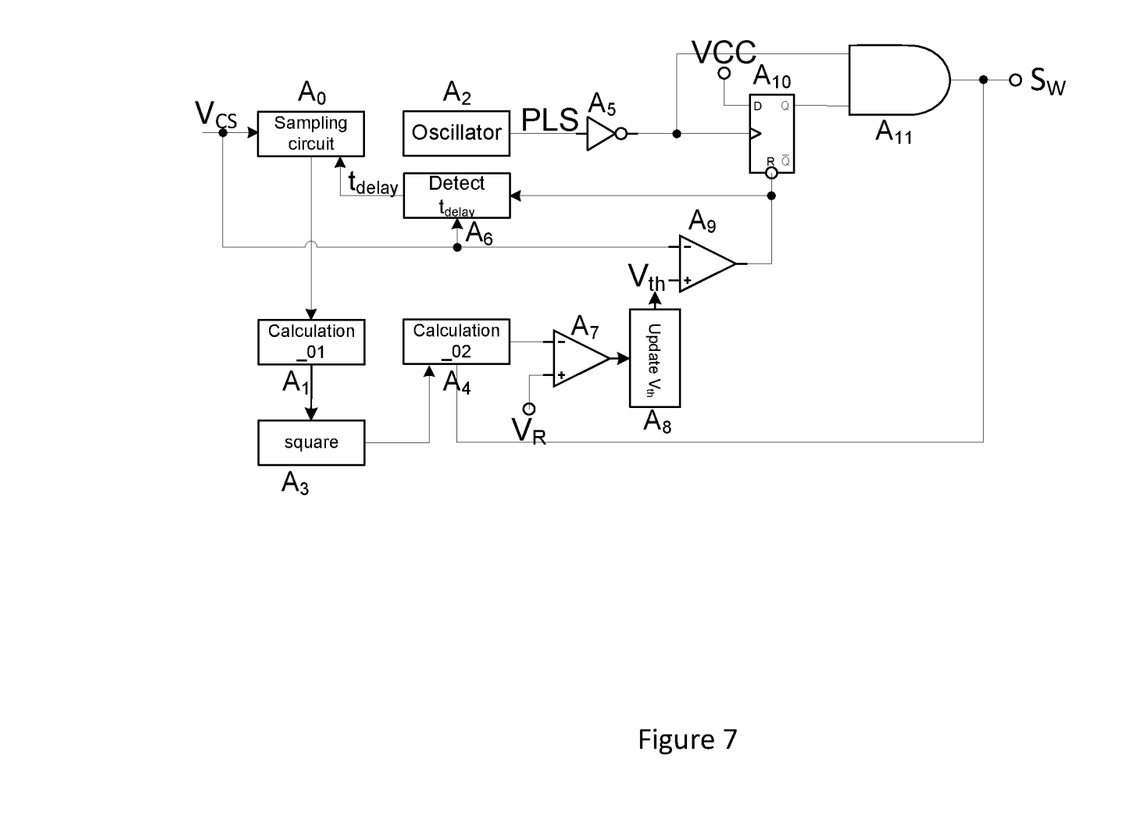
FIG. 7 illustrates a circuit diagram of an embodiment of circuitry for measuring output power for an isolated converter.

FIG. 7 illustrates an embodiment of the circuitry 106 included in or associated with the controller 104 for calculating the output power of the isolated converter for CCM operation. According to this embodiment, sample and hold circuit $A_0$ captures the $V_{CS}$ voltage at times $t_1$ and $t_2$ where $t_1$ equals $t_{delay}$ from the previous switching cycle and $t_2$ equals $2 \times t_{delay}$ from the previous switching cycle. Comparator $A_9$ detects when the current sense signal $V_{CS}$ reaches the predefined threshold voltage $V_{th}$. The current sense signal $V_{CS}$ continues to rise until the primary-side power switch device Q1 turns off. At this point, $V_{CS}$ begins to drop. Circuit $A_6$ detects when $V_{CS}$ drops to 0V, and provides the corresponding off-time delay $t_{delay}$ to sample and hold circuit $A_0$. Oscillator $A_2$ generates signal PLS, and in conjunction with buffer $A_5$, flip-flop $A_{10}$ and logic gate $A_{11}$, turns on the power switch device Q1 at the beginning of the next switching cycle.

After the primary-side power switch device Q1 is turned off, circuit $A_1$ calculates $V_{valley} = 2 \times V_{LEB} - V_{2LEB}$ and $V_{peak} = V_{th} + V_{2LEB} - V_{LEB}$. Circuit $A_3$ performs a square function on the output of circuit $A_1$ over the turn-off period $T_{OFF}$ of power switch device Q1. The output of the square function is input to circuit $A_4$, which calculates $V_{peak}^2 - V_{valley}^2$. Comparator $A_7$ compares the output of circuit $A_4$ with target voltage $V_R$. Circuit $A_8$ updates the predefined threshold voltage $V_{th}$ assigned to the power switch device Q1 for the next switching cycle, based on the comparison results as follows. The controller 104 decreases the predefined threshold voltage $V_{th}$ assigned to the power switch device Q1 for the next switching cycle if the voltage difference value $(V_{peak}^2 - V_{valley}^2)$ output by circuit $A_4$ is above target voltage $V_R$ in the present switching cycle, to decrease the output of the calculation $V_{peak}^2 - V_{valley}^2$. The controller 104 increases the predefined threshold voltage $V_{th}$ for the next switching cycle if the voltage difference value $(V_{peak}^2 - V_{valley}^2)$ output by circuit $A_4$ is below target voltage $V_R$ in the present switching cycle, to increase the output of the calculation $V_{peak}^2 - V_{valley}^2$. The controller 104 maintains the predefined threshold voltage $V_{th}$ for the next switching cycle if the voltage difference value $(V_{peak}^2 - V_{valley}^2)$ output by circuit $A_4$ is within target voltage $V_R$ plus tolerance (e.g. 2%, 5%, etc.) in the present switching cycle, to keep the output of the calculation $(V_{peak}^2 - V_{valley}^2)$ the same as the previous switching cycle.

Figure 8:
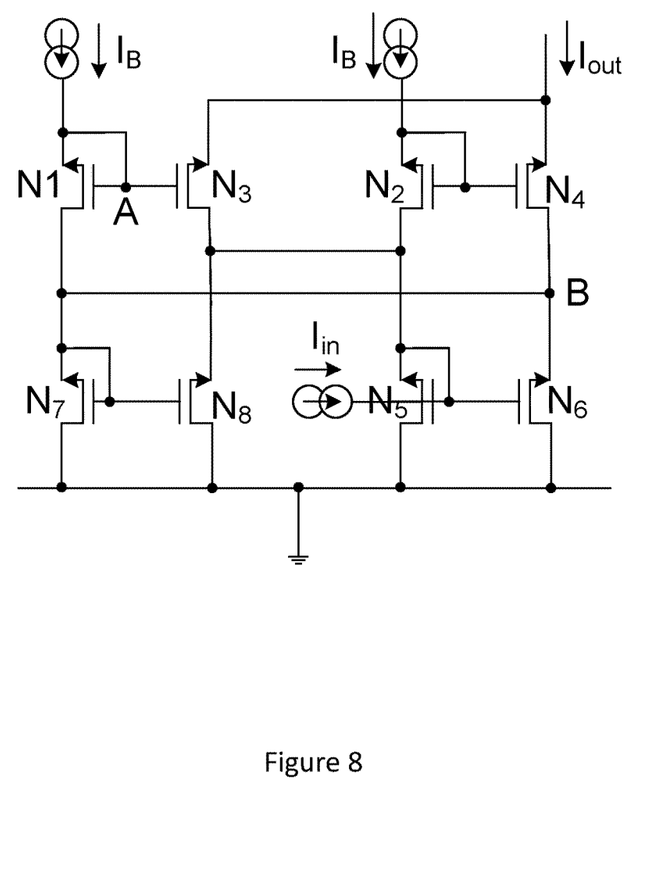
FIG. 8 illustrates a circuit diagram of an embodiment of circuitry for implementing a square function for use in measuring output power for an isolated converter.

FIG. 8 illustrates an embodiment of the square circuit $A_3$ implemented by the controller 104. The square circuit is a four-quadrant current multiplier that includes transistors N1 through N8 that operate in saturation. Transistors N1 through N4 are connected in a translinear loop. Transistor pairs N5/N6 and N7/N8 are configured as respective current mirrors. The circuit squares both the sum and the difference of currents $I_B$, and subtracts the results from each other in order to multiply the currents. The calculation performed by the square circuit $A_3$ is given by:

$$I_{out} = 2 \times I_B + \frac{I_{in}^2}{8 \times I_B} \quad (13)$$

The square circuit $A_3$ is temperature and process insensitive.

Figure 9:
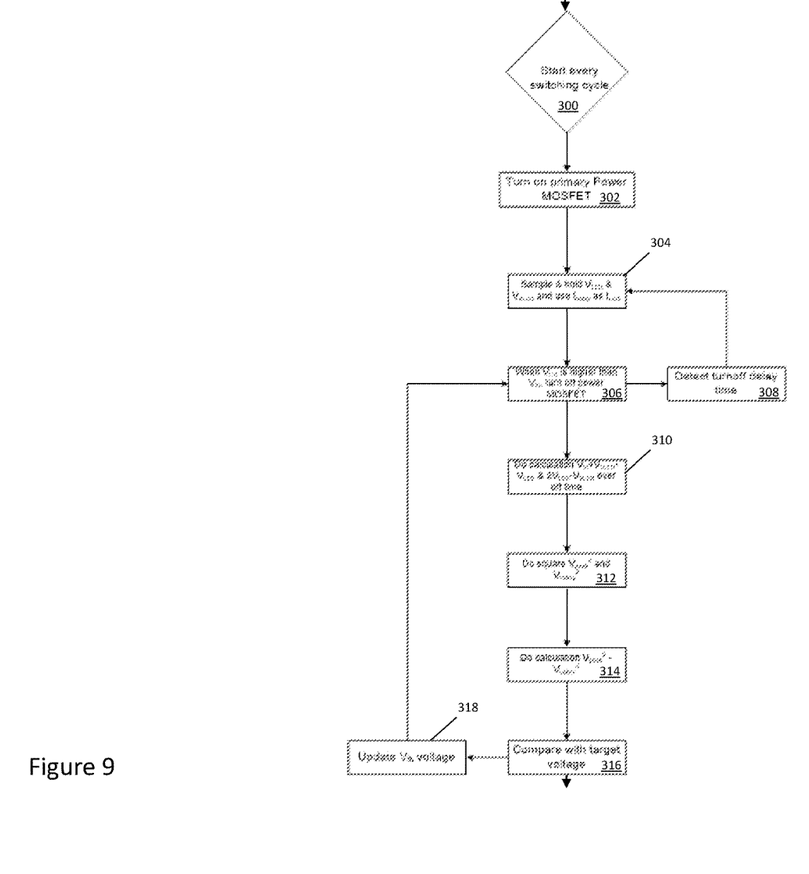
FIG. 9 illustrates a flow diagram of an embodiment of a method for measuring output power for an isolated converter.

FIG. 9 illustrates an embodiment of a method for calculating the output power of the power converter. At the start of each switching cycle (Block 300), the primary-side power switch device Q1 is turned on by internal oscillator output signal PLS (302). The controller 104 samples and holds (captures) the $V_{CS}$ measurement $V_{LEB}$ taken at time $t_1$ and the $V_{CS}$ measurement $V_{2LEB}$ taken at time $t_2$, where $t_1$ equals $t_{delay}$ of the previous switching cycle and $t_2$ equals $2 \times t_{delay}$ (Block 304). When the current sense signal $V_{CS}$ reaches the predefined threshold voltage $V_{th}$, the controller 104 initiates turn-off of the primary-side power switch device Q1 (Block 306). The controller 104 determines the turn-off $t_{delay}$ of the power switch device Q1 (Block 308), and uses $t_{delay}$ as the leading edge blanking time $t_{LEB}$ for the next switching cycle (Block 304). After power switch device Q1 is turned off, the controller 104 calculates $V_{peak} = V_{th} + V_{2LEB} - V_{LEB}$ and $V_{valley}=2\times V_{LEB}-V_{2LEB}$ over the off-time period $T_{OFF}$ of power switch device Q1 (Block 310). After this calculation, the controller 104 implements the square function for $V_{peak}^2$ and $V_{valley}^2$ (Block 312), and after the square function, calculates $V_{peak}^2-V_{valley}^2$ (Block 314).

The controller 104 compares the output of the $V_{peak}^2-V_{valley}^2$ calculation with target voltage $V_R$ (Block 316), and updates the $V_{th}$ voltage value for the next switching cycle (Block 318). When the output of the $(V_{peak}^2-V_{valley}^2)$ calculation is higher than target voltage $V_R$, for the next switching cycle, the controller 104 can reduce $V_{TH}$ to decrease the calculation output $(V_{peak}^2-V_{valley}^2)$. When the output of the $(V_{peak}^2-V_{valley}^2)$ calculation is lower than target voltage $V_R$, for the next switching cycle, the controller 104 can increase $V_{TH}$ to increase the calculation output $(V_{peak}^2-V_{valley}^2)$. When the output of the $(V_{peak}^2-V_{valley}^2)$ calculation is within $V_R$ plus tolerance, for the next switching cycle, the controller 104 can maintain the same $V_{TH}$ value so that the calculation output $(V_{peak}^2-V_{valley}^2)$ is the same as the previous switching cycle.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A power converter, comprising:
    a power switch device coupled to a magnetic device; and
    a controller configured to:
        generate a switching signal for driving the power switch device, based on a feedback signal and a current sense signal which corresponds to a switching current of the magnetic device; and
        calculate at least one of an average output current and a maximum output power for the power converter, based on at least two measurements of the current sense signal taken during a turn-on period of the power switch device, a first one of the at least two measurements being taken at the end of a first time delay from the start of the turn-on period, a second one of the at least two measurements being taken when a magnitude of the current sense signal reaches a predefined threshold voltage assigned to the power switch device and above which the power switch device is designed to turn-off.

2. The power converter of claim 1, wherein in a present switching cycle the controller is configured to determine a turn-off delay from when the current sense signal reaches the predefined threshold voltage assigned to the power switch device to when the power switch device turns off, and wherein in a next switching cycle the controller is operable to set the first time delay for taking the first one of the at least two measurements of the current sense signal to the turn-off delay determined for the present switching cycle.

3. The power converter of claim 2, wherein the controller is configured to determine the turn-off delay as the amount of time for the magnitude of the current sense signal to decrease from the predefined threshold voltage assigned to the power switch device to zero volts.

4. The power converter of claim 1, wherein the controller comprises circuitry configured to sample and hold the first one of the at least two measurements at the end of the first time delay, and sample and hold the second one of the at least two measurements when the magnitude of the current sense signal reaches the predefined threshold voltage assigned to the power switch device.

5. The power converter of claim 1, wherein the controller comprises a comparator configured to compare a sampled version of the current sense signal to the predefined threshold voltage assigned to the power switch device for determining when the magnitude of the current sense signal reaches the predefined threshold voltage of the power switch device.

6. The power converter of claim 1, wherein the controller is configured to add the first one and the second one of the at least two measurements, and integrate the sum over a turn-off period of the power switch device.

7. The power converter of claim 6, wherein the controller is configured to decrease the predefined threshold voltage assigned to the power switch device for a next switching cycle if the integrated sum of the first one and the second one of the at least two measurements is above a target voltage plus a tolerance in the present switching cycle, increase the predefined threshold voltage assigned to the power switch device for the next switching cycle if the integrated sum of the first one and the second one of the at least two measurements is below the target voltage less the tolerance in the present switching cycle, and maintain the same predefined threshold voltage assigned to the power switch device for the next switching cycle if the integrated sum of the first one and the second one of the at least two measurements is within a range of the target voltage plus or minus the tolerance in the present switching cycle.

8. The power converter of claim 1, wherein the controller is configured to calculate the maximum output power for the power converter based on the first one of the at least two measurements, the second one of the at least two measurements and a third one of the at least two measurements taken between the first one and the second one of the at least two measurements.

9. The power converter of claim 8, wherein the controller is configured to take the third one of the at least two measurements at the end of a second time delay after the first one of the at least two measurements is taken, and wherein the second time delay equals the first time delay.

10. The power converter of claim 9, wherein in a present switching cycle the controller is configured to determine a turn-off delay from when the current sense signal reaches the predefined threshold voltage assigned to the power switch device to when the power switch device turns off, and wherein in a next switching cycle the controller is operable to set both the first time delay and the second time delay to the turn-off delay determined for the present switching cycle.

11. The power converter of claim 8, wherein the controller is configured to calculate a valley voltage and a peak voltage based on the first one, the second one and the third one of the at least two measurements, and wherein the controller is operable to calculate a voltage difference value based on the difference between the valley voltage squared and the peak voltage squared.

12. The power converter of claim 11, wherein the controller is configured to decrease the predefined threshold voltage assigned to the power switch device for a next switching cycle if the voltage difference value is above a target voltage plus a tolerance in the present switching cycle, increase the predefined threshold voltage assigned to the power switch device for the next switching cycle if the voltage difference value is below the target voltage less the tolerance in the present switching cycle, and maintain the same predefined threshold voltage assigned to the power switch device for the next switching cycle if the voltage difference value is within a range of the target voltage plus or minus the tolerance in the present switching cycle.

13. A method of operating a power converter having a power switch device coupled to a magnetic device, the method comprising:
generating a switching signal for driving the power switch device, based on a feedback signal and a current sense signal which corresponds to a switching current of the magnetic device;
capturing a first measurement of the current sense signal taken at the end of a first time delay from the start of a turn-on period of the power switch device;
capturing a second measurement of the current sense signal taken when a magnitude of the current sense signal reaches a predefined threshold voltage assigned to the power switch device and above which the power switch device is designed to turn-off; and
calculating at least one of an average output current and a maximum output power for the power converter, based on at least the first and the second captured measurements of the current sense signal.

14. The method of claim 13, further comprising:
in a present switching cycle, determining a turn-off delay from when the current sense signal reaches the predefined threshold voltage assigned to the power switch device to when the power switch device turns off; and
in a next switching cycle, setting the first time delay at which the first measurement of the current sense signal is captured to the turn-off delay determined for the present switching cycle.

15. The method of claim 13, wherein calculating the average output current for the power converter comprises:
adding the first and the second captured measurements of the current sense signal; and
integrating the sum over a turn-off period of the power switch device.

16. The method of claim 15, further comprising:
decreasing the predefined threshold voltage assigned to the power switch device for a next switching cycle if the integrated sum of the first and the second captured measurements is above a target voltage plus a tolerance in the present switching cycle;
increasing the predefined threshold voltage assigned to the power switch device for the next switching cycle if the integrated sum of the first and the captured measurements is below the target voltage less the tolerance in the present switching cycle; and
maintaining the same predefined threshold voltage assigned to the power switch device for the next switching cycle if the integrated sum of the first and the second captured measurements is within a range of the target voltage plus or minus the tolerance in the present switching cycle.

17. The method of claim 13, further comprising:
capturing a third measurement of the current sense signal taken between the first and the second measurements of the current sense signal taken,
wherein the maximum output power for the power converter is calculated based on the first, the second and the third captured measurements of the current sense signal.

18. The method of claim 17, further comprising:
in a present switching cycle, determining a turn-off delay from when the current sense signal reaches the predefined threshold voltage assigned to the power switch device to when the power switch device turns off; and
in a next switching cycle, setting the first time delay for capturing the third measurement of the current sense signal and a second time delay for capturing the third measurement of the current sense signal to the turn-off delay determined for the present switching cycle.

19. The method of claim 17, further comprising:
calculating a valley voltage and a peak voltage based on the first, the second and the third captured measurements of the current sense signal; and
calculating a voltage difference value based on the difference between the valley voltage squared and the peak voltage squared.

20. The method of claim 19, further comprising:
decreasing the predefined threshold voltage assigned to the power switch device for a next switching cycle if the voltage difference value is above a target voltage plus a tolerance in the present switching cycle;
increasing the predefined threshold voltage assigned to the power switch device for the next switching cycle if the voltage difference value is below the target voltage less the tolerance in the present switching cycle; and
maintaining the same predefined threshold voltage assigned to the power switch device for the next switching cycle if the voltage difference value is within a range of the target voltage plus or minus the tolerance in the present switching cycle.

* * * * *